US012162549B2

(12) United States Patent
Messina et al.

(10) Patent No.: US 12,162,549 B2
(45) Date of Patent: Dec. 10, 2024

(54) MOTOR-VEHICLE WITH DRIVING AND STEERING REAR WHEELS

(71) Applicant: FCA Italy S.p.A., Turin (IT)

(72) Inventors: Alessandro Messina, Turin (IT); Giampaolo Maschietti, Turin (IT)

(73) Assignee: FCA Italy S.p.A., Turin (IT)

( * ) Notice: Subject to any disclaimer, the term of this patent is extended or adjusted under 35 U.S.C. 154(b) by 575 days.

(21) Appl. No.: 17/496,295

(22) Filed: Oct. 7, 2021

(65) Prior Publication Data

US 2022/0119036 A1    Apr. 21, 2022

(30) Foreign Application Priority Data

Oct. 15, 2020 (EP) .................................... 20201990

(51) Int. Cl.
*B62D 7/15* (2006.01)
*B62D 5/04* (2006.01)
*B62D 7/20* (2006.01)

(52) U.S. Cl.
CPC ............. *B62D 7/15* (2013.01); *B62D 5/0421* (2013.01); *B62D 5/0445* (2013.01); *B62D 7/20* (2013.01)

(58) Field of Classification Search
CPC ...... B62D 7/15; B62D 5/0421; B62D 5/0445; B62D 7/20
See application file for complete search history.

(56) References Cited

U.S. PATENT DOCUMENTS

| | | | | |
|---|---|---|---|---|
| 10,486,513 B2* | 11/2019 | Battaglia | ................ | B60G 11/08 |
| 2014/0265201 A1* | 9/2014 | Luttinen | ................ | B60G 7/006 |
| | | | | 280/93.512 |
| 2015/0183455 A1* | 7/2015 | Wang | .................... | F16C 19/547 |
| | | | | 180/444 |
| 2019/0375453 A1* | 12/2019 | Buchwitz | ............... | B62D 7/166 |

FOREIGN PATENT DOCUMENTS

| | | | |
|---|---|---|---|
| EP | 0307547 A1 | | 3/1989 |
| JP | 2018100076 A | * | 6/2018 |

OTHER PUBLICATIONS

European Search Report dated Mar. 25, 2021. 10 pages.

* cited by examiner

*Primary Examiner* — Jacob D Knutson
(74) *Attorney, Agent, or Firm* — RMCK Law Group PLC

(57) ABSTRACT

A vehicle with driving and steering rear wheels includes a rear suspension system having a support frame mounted on the vehicle body. For each rear wheel, a wheel support is connected to the frame by oscillating arms. An actuator is mounted on the frame, with control rods, protruding from opposite ends of the actuator body, and connected to the wheel supports by control arms. Within a space between the rear wheels, there is a rear motor or differential. The actuator body is mounted on the frame along a transverse direction spaced apart from an axis of the rear wheels to avoid interference with the motor or differential. The control arms are substantially parallel to a transverse direction perpendicular to the longitudinal direction, or form an angle therewith not exceeding 15 degrees. The control rods are connected to the control arms with the interposition of a transmission.

4 Claims, 8 Drawing Sheets

MOTOR-VEHICLE WITH DRIVING AND STEERING REAR WHEELS

CROSS-REFERENCE TO RELATED APPLICATION

This application claims priority to European Patent Application No. 20201990.7 filed Oct. 15, 2020. The disclosure of the above application is incorporated herein by reference in its entirety.

FIELD OF THE INVENTION

The present invention relates to a motor-vehicle with driving and steering rear wheels. The invention relates, in particular, to a motor-vehicle with a rear suspension system, for example of the multi-link type, including a support frame of the suspension mounted on the body of the motor-vehicle and, for each rear wheel, a wheel support (knuckle) connected to the support frame by means of a plurality of oscillating arms, articulated to the wheel support through joints that define a steering axis of the rear wheel. The motor-vehicle comprises an actuator for controlling the steering of the rear wheels, comprising an elongated body mounted on the support frame in a direction transverse to the longitudinal direction of the motor-vehicle and provided with two control rods, protruding from opposite ends of the body of the actuator.

PRIOR ART

According to a conventional solution in motor-vehicles of this type, the actuator control rods control steering of the wheel supports by means of two control articulated arms that connect the actuator rods to the wheel supports.

Still according to a conventional technique, the steering actuator of the rear wheels is electrically-operated, and is controlled by an electronic controller on board the motor-vehicle, as a function of the rotation angle of the steering wheel of the motor-vehicle, and as a function of the speed of the motor-vehicle (as well as possibly as a function also of other parameters, such as lateral acceleration and yaw acceleration) in order to obtain an optimal performance of the motor-vehicle in a curve.

The Technical Problem

In the case of a motor-vehicle equipped with driving rear wheels, in which the space between the two rear wheels is occupied by a rear motor of the motor-vehicle, for example, an electric motor, or by a rear differential unit of the motor-vehicle, the need arises to position the steering actuator of the rear wheels in a transverse direction spaced apart from the rear wheel axis to an extent sufficient to avoid interference between the actuator and the motor or differential unit. However, a high offset between the actuator and the wheel axis consequently leads to the need to arrange the control articulated arms controlling steering of the wheel supports in strongly inclined directions with respect to a transverse direction, perpendicular to the longitudinal direction of the motor-vehicle, which affects the handling performance of the suspension.

OBJECT OF THE INVENTION

The object of the present invention is to solve the aforesaid problem.

Another object of the invention is to achieve the aforesaid objective without introducing an excessive complication in the suspension design, and without significantly increase the weight of the vehicle.

SUMMARY OF THE INVENTION

In order to achieve this object, the invention relates to a motor-vehicle having the characteristics indicated above, wherein the two control articulated arms controlling steering of the wheel supports are substantially parallel to a direction perpendicular to the longitudinal direction of the motor-vehicle, or they form an angle therewith not greater than 15 degrees, and wherein the aforesaid control rods that protrude from the body of the actuator are each connected to the control arm (or toe link) of the respective wheel support with the interposition of a transmission.

In a first embodiment, each of the two transmissions that connect the two actuator rods to the control arms of the two wheel supports includes a rocker arm, pivotally mounted on the support frame around a substantially vertical axis, and having opposite ends articulated, respectively, to the respective actuator rod and to the respective control arm of the wheel support.

In a second embodiment, each of the two transmissions that connect the actuator rods to the control arms of the two wheel supports includes a shaft rotatably mounted on the support frame about an axis substantially parallel to the longitudinal direction of the motor-vehicle, and carrying a first crank connected to the respective actuator rod, and a second crank connected to the respective control arm of the wheel support.

In a third embodiment of the invention, each of the two transmissions connecting the actuator rods to the control arms of the wheel supports includes a lever, having one end rotatably mounted on the support frame about an axis substantially parallel to the longitudinal direction of the motor-vehicle; an end portion swivelly connected to the respective control arm of the wheel support, and an intermediate portion swivelly connected to the actuator rod.

In all the embodiments described above, the aforesaid support frame preferably comprises two side longitudinal beams connected together by a front cross-member and a rear cross-member. Still preferably, the longitudinal beams of the frame each have a hollow structure, with an upper wall and a lower wall.

In the case of the aforesaid first embodiment, each of the rocker arms has a central portion arranged inside the cavity of the respective longitudinal beam of the support frame, and is rotatably mounted on a vertical shaft attached to the support frame and extending inside said cavity, between the upper wall and the lower wall of the respective longitudinal beam of the frame. The ends of the rocker arm protrude outside the respective longitudinal beam through openings in the beam, and are pivotally connected to the respective actuator rod and to the respective control arm of the wheel support.

Thanks to the characteristics indicated above, the invention makes it possible to mount the actuator for steering the rear wheels in a position spaced apart from the wheel axis to an extent sufficient to avoid interference with the motor or the differential gear assembly located in the space between the rear wheels. At the same time, the control arms controlling steering of the wheel supports can have an orientation substantially parallel to a transverse direction, perpendicular to the longitudinal direction of the motor-vehicle or—in any case—forming an angle not exceeding 15 degrees with respect to this direction, so as to ensure the best performances in suspension handling.

BRIEF DESCRIPTION OF THE DRAWINGS

Further characteristics and advantages of the invention will become apparent from the description that follows with reference to the appended drawings, provided purely by way of non-limiting example, wherein.

DESCRIPTION OF PREFERRED EMBODIMENTS

In the attached drawings, reference number 1 generally designates a rear suspension system of the multi-link type for a motor-vehicle with driving and steering rear wheels. It is understood that the specific configuration of the suspension that is illustrated herein is provided purely by way of non-limiting example.

Figure 5:
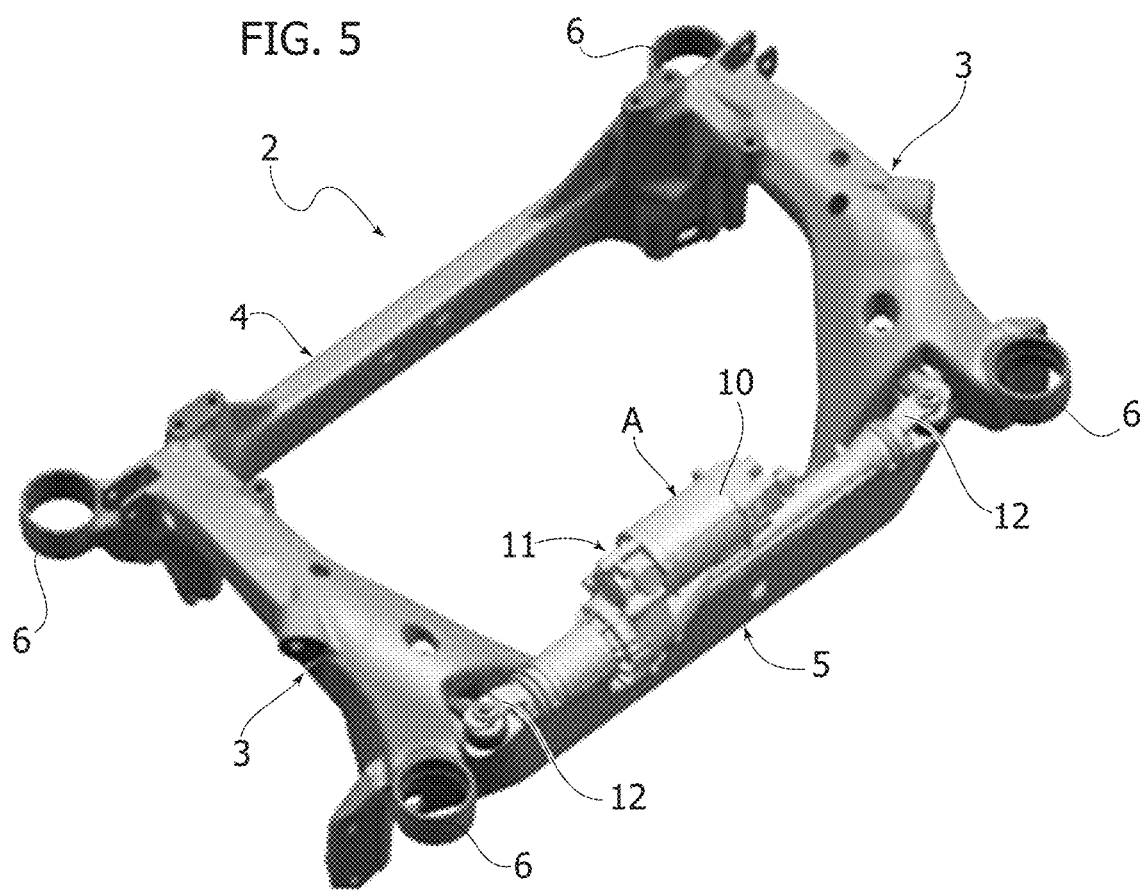
FIG. 5 is a perspective view of the support frame of the rear suspension system, with the actuator for steering the rear wheels mounted on this frame.
Figure 6:
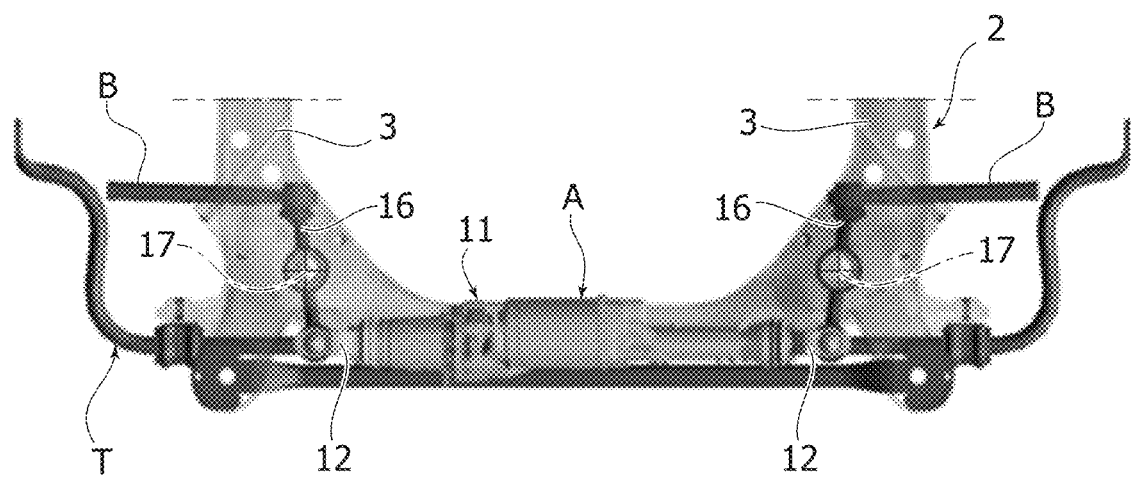
FIG. 6 is a partial plan view of the assembly of FIG. 5.

In the case of the aforesaid example, the suspension system includes a support frame 2, better visible in FIG. 5, for example made of sheet metal, and including two side longitudinal beams 3, directed in directions substantially parallel to the longitudinal direction of the motor-vehicle, which are connected at their ends by a front cross-member 4 and a rear cross-member 5.

Again with reference to the illustrated example, the support frame 2 includes connecting portions 6, in the specific example in the form of cylindrical rings with a vertical axis, arranged at the four vertices of the frame and configured to be connected under the body of the motor-vehicle with the interposition of elastic supports The aforesaid construction details are not illustrated herein, since they can be made in any known way.

Figure 10:
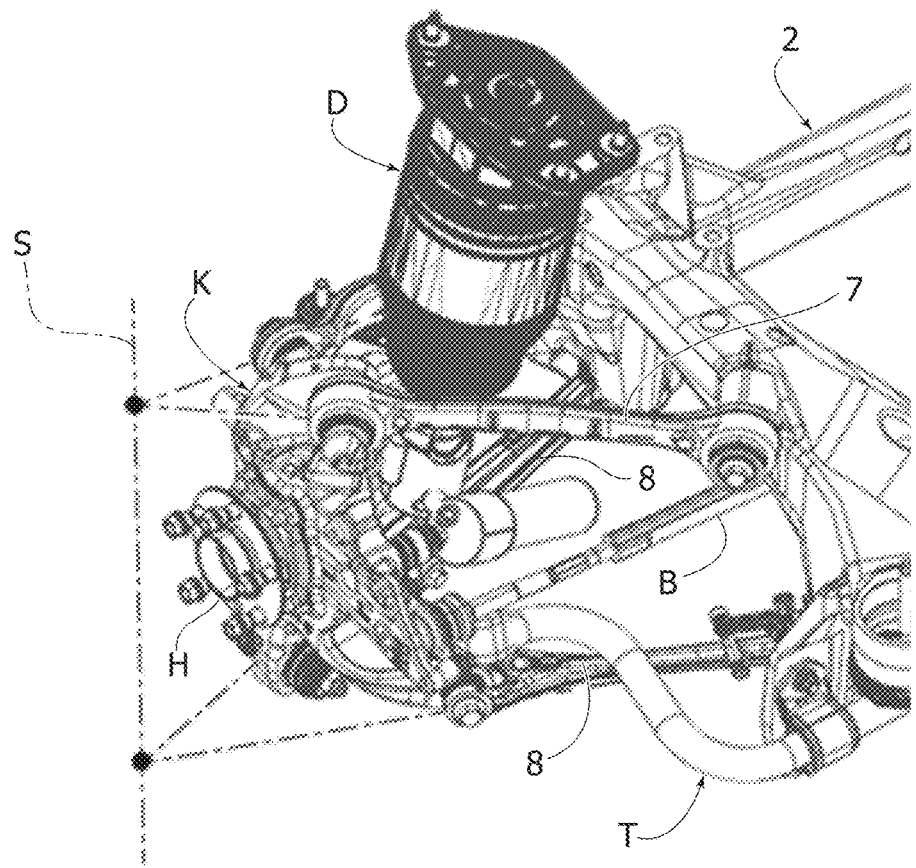
FIG. 10 is an additional perspective view of the rear suspension system.

With reference again to FIGS. 1-3, each rear wheel R is mounted on a hub H rotatably supported by a wheel support K (knuckle). Each wheel support K is, in turn, connected to the support frame 2, for example, by means of a pair of upper oscillating arms 7 and a pair of lower oscillating arms 8 (see in particular FIG. 10). Each oscillating arm 7, 8 has its ends swivelly connected to the wheel support K and the support frame 2, respectively, by means of elastic bushings. These construction details are also not further described or illustrated herein, since they also can be made in any known way. Since the upper oscillating arms and the lower oscillating arms are connected to the wheel support K at points spaced apart from each other (see FIG. 10), they define a steering axis S of the wheel support K, which is a virtual axis, passing through the intersection points of the extension lines of the upper oscillating arms 7 and lower oscillating arms 8. While the vehicle is running, the inclination of the arms 7, 8 varies according to the movement of the suspension and, consequently, also the steering axis S varies with the movements of the suspension.

As indicated above, the invention relates to a motor-vehicle equipped with rear driving wheels. For this purpose, a motor M (for example, an electric motor) or a rear differential unit (not illustrated) is mounted in the space between the rear wheels, and in particular in the space defined between the side longitudinal beams 3 and the cross-members 4, 5 of the support frame 2. In the case an electric motor is provided, the motor assembly includes a reducer gear unit from which two shafts (not illustrated) protrude, connected to the wheel hubs H by respective transmissions including articulated joints (not illustrated). These details are also not described, since they can be made in any known way.

Figure 1:
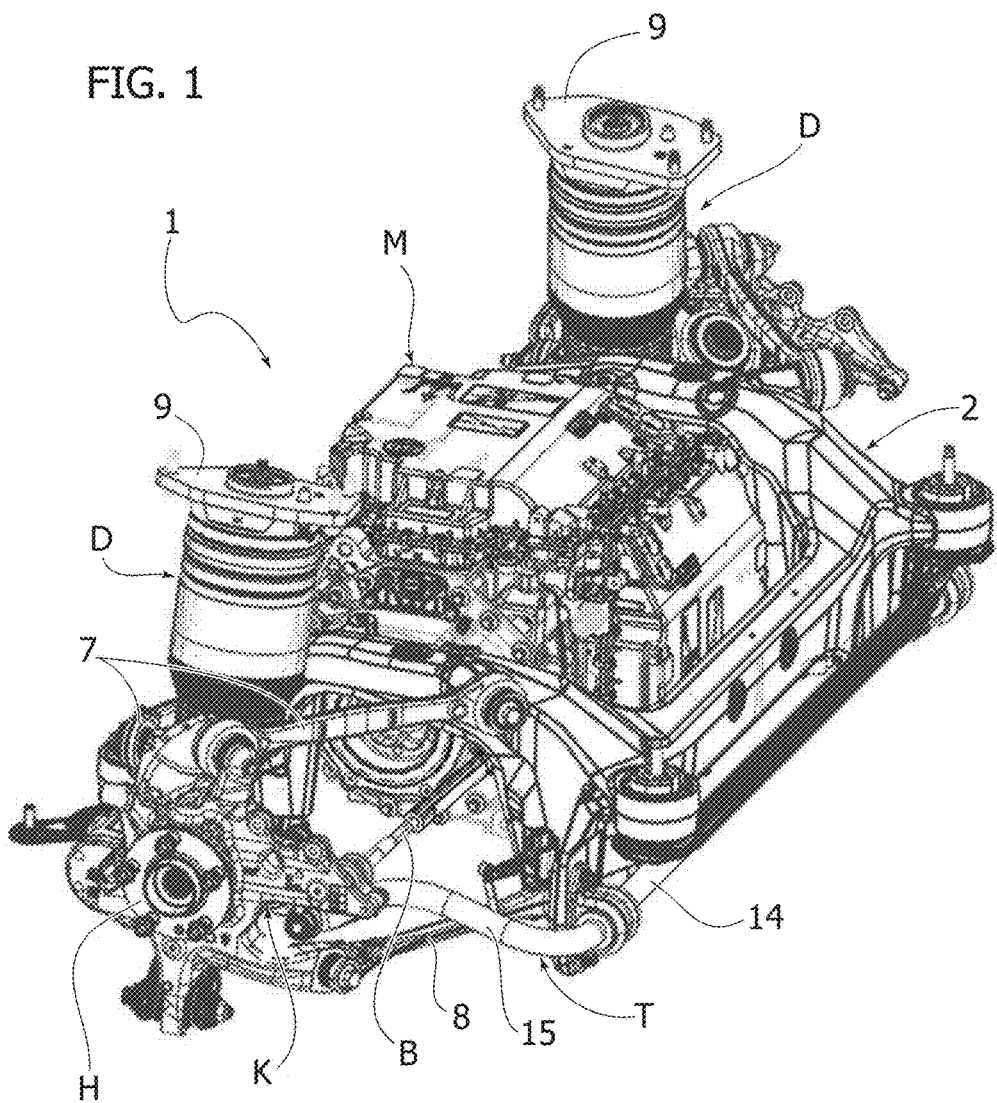
FIG. 1 is a perspective view of a rear suspension unit of a motor-vehicle with driving and steering rear wheels, equipped with a rear electric motor, located in the space between the rear wheels.

FIG. 1 also shows two spring-shock absorber assemblies D whose upper ends are connected to attachment plates 9, intended to be attached to the body of the motor-vehicle, and whose lower ends (not visible in the drawings) are intended either to be connected directly to the wheel supports K or to the respective lower oscillating arms of the suspension.

The suspension system also includes a torsion bar T, including a central portion 14 mounted on the support frame 2 in a direction transverse to the longitudinal direction of the motor-vehicle and having two end arms 15 (one of which is visible, for example, in FIG. 1) connected to the wheel supports K.

In order to control steering of the rear wheels, the assembly described above must be equipped with an actuator device A.

FIG. 5 illustrates the actuator device A, which is provided in an embodiment example of the present invention. In the case of this example, the actuator device A includes an electric motor 10, whose shaft (not visible in the drawings) is connected by means of a transmission belt (of which the casing 11 is illustrated) to a nut member (not visible in the drawings) rotatably mounted inside the body of the actuator device A. With reference to FIG. 5, the body of the actuator device A has an elongated shape, and is fixed to the rear cross-member 5 of the support frame 2 along a transverse direction perpendicular to the longitudinal direction of the motor-vehicle. According to a per se known technique, the aforesaid nut member is in a fixed axial position and is engaged by a screw member (not visible in the drawings), whose ends are connected to two control rods that protrude on opposite sides from the casing of the actuator device A. These rods protruding from the actuator body constitute two control rods for controlling steering the rear wheels.

All the construction details of the actuator device are not described or illustrated herein, since they can be made in any known way, and also because they do not fall, taken alone, within the scope of the present invention.

As indicated above, the steering actuator of the rear wheels is controlled by an electronic controller on board the motor-vehicle as a function of the rotation angle transmitted to the steering wheel of the motor-vehicle, and as a function of the speed of the motor-vehicle (as well possibly as a function of other parameters, such as lateral acceleration and yaw acceleration) in order to obtain an optimal performance of the motor-vehicle in a curve.

The two rods 12 of the actuator are designed to control the steering of the wheel supports K by means of two respective articulated control arms B controlling the wheel supports.

For the purpose of an optimal handling performance of the suspension, it is essential that the control arms B controlling steering of the wheel supports are oriented in directions substantially parallel to a transverse direction perpendicular to the longitudinal direction of the motor-vehicle or—in any case—forming an angle with this direction that is not greater than 15 degrees (with reference to a design condition of the motor-vehicle).

Figure 2:
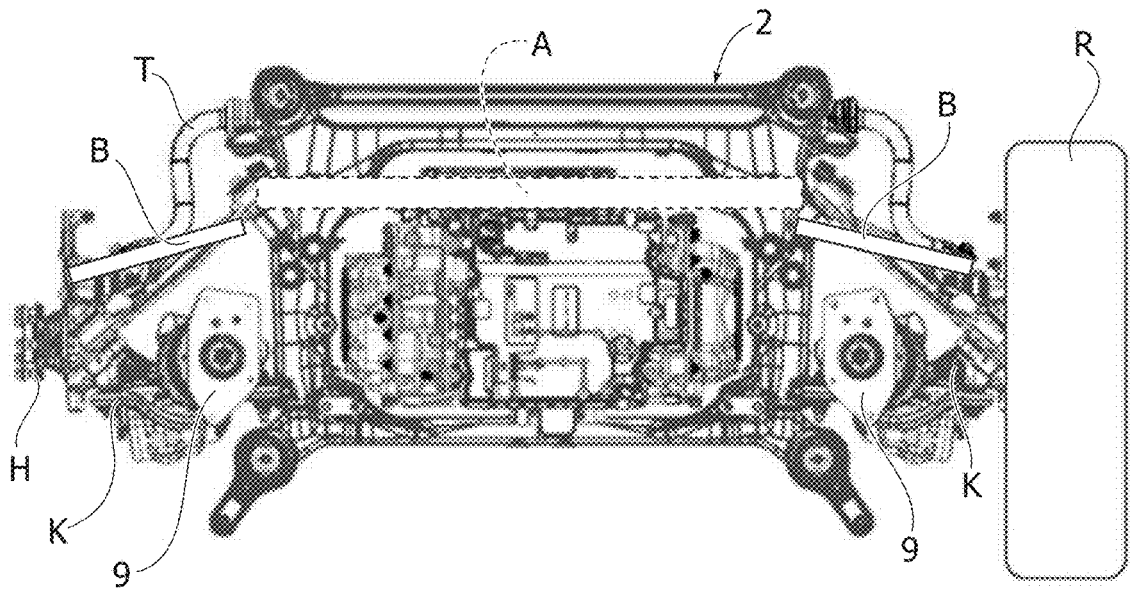
FIG. 2 is a plan view of the unit of FIG. 1, which shows that the actuator device controlling steering of the rear wheels cannot be arranged in the space occupied by the motor.

FIG. 2 of the attached drawings shows how the arrangement of the arms B in directions that are slightly inclined with respect to the aforesaid transverse direction would entail placing the actuator device A in a position in which it interferes with the motor M (or the rear differential unit), which occupies the space between the rear wheels.

Figure 3:
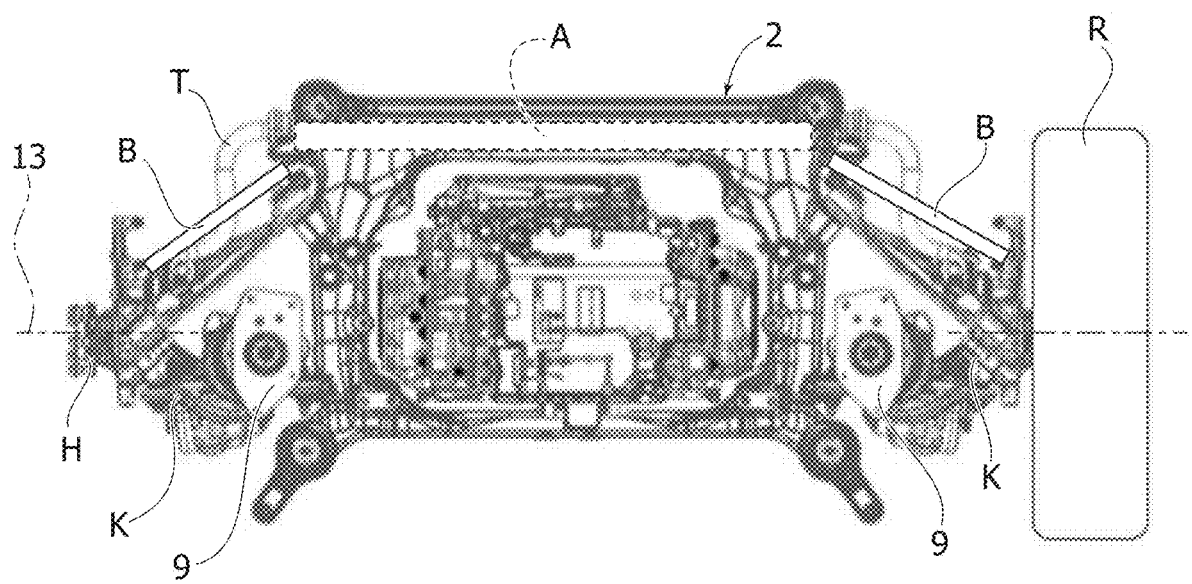
FIG. 3 is a plan view similar to FIG. 2, which shows that mounting the actuator in a position spaced apart from the wheel axis to an extent sufficient to avoid interference with the motor, results into an arrangement of the control arms controlling steering of the wheel supports along directions strongly inclined with respect to a transverse direction, perpendicular to the longitudinal direction of the motor-vehicle.
Figure 4:
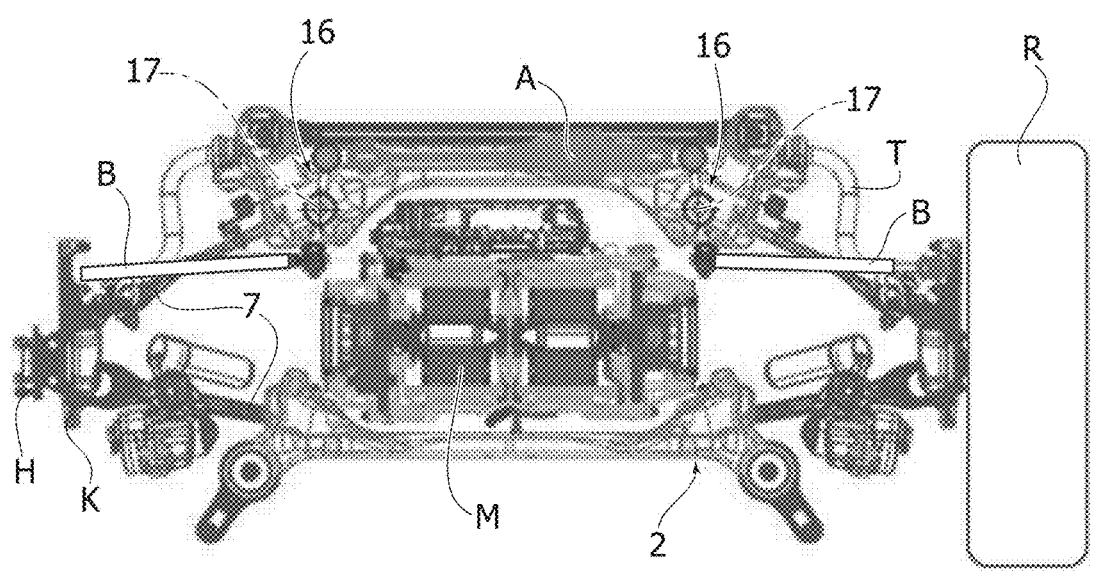
FIG. 4 is a plan view of a first embodiment of the rear suspension system of the motor-vehicle according to the invention.

FIG. 3 of the attached drawings shows how positioning of the actuator device A, at a distance from the wheel axis 13 that is sufficient to avoid interference with the motor M, involves a strongly inclined orientation of the control arms B of the wheel supports K with respect to a transverse direction, perpendicular to the longitudinal direction of the motor-vehicle, which affects the performance of the suspension.

According to the invention, the aforesaid problem is solved by providing a connection transmission between the actuating rods protruding from the body of the actuator device A and the control arms B of the wheel supports K.

Figure 9:
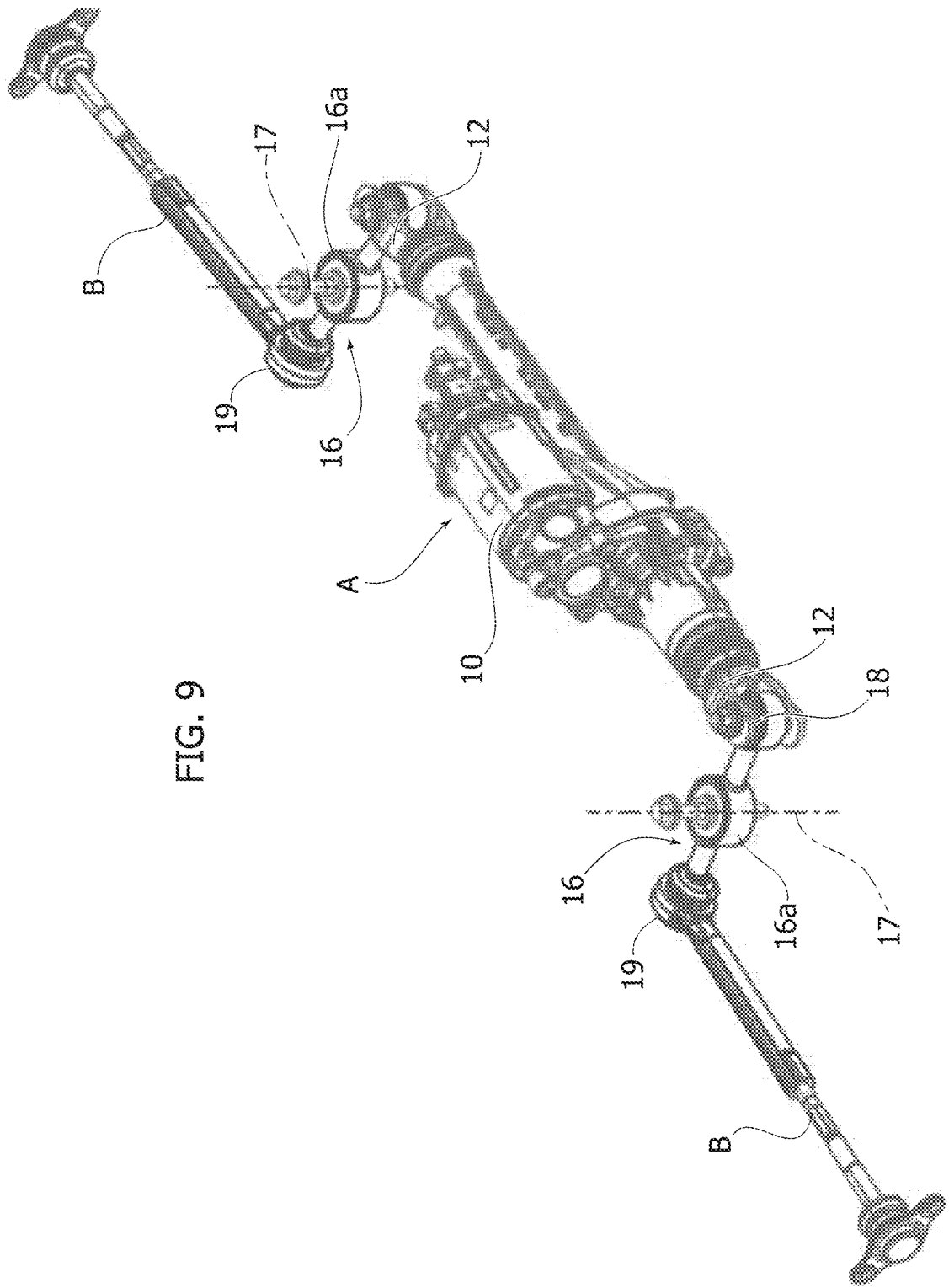
FIG. 9 is a perspective view of the actuation system controlling steering of the rear wheel supports.

As can be seen, for example, in FIG. 9, according to a first embodiment of the invention, the transmission that connects each rod 12 of the actuator A to the respective control arm B of the wheel support consists of a rocker arm 16, rotatably mounted on the support frame 2, with a central portion 16A thereof, around a substantially vertical axis 17 and having opposite ends connected by joints 18, 19, respectively, to the actuator rod 12 and to the control arm B of the wheel support K.

In the exemplary embodiment illustrated herein, each of the longitudinal beams 3 forming part of the support frame 2 has a hollow sheet metal structure, with an upper wall and a lower wall.

Figure 7:
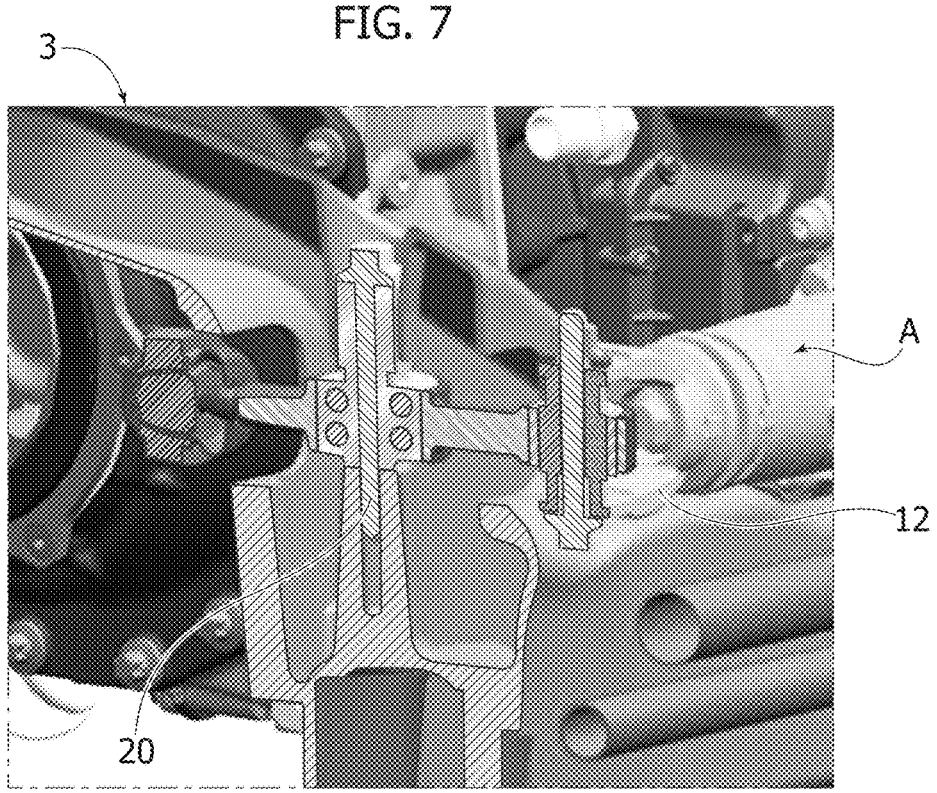
FIG. 7 is a cross-sectional perspective view on an enlarged scale of a detail of the transmission that connects the aforesaid actuator to the control arm of a respective wheel support.
Figure 8:
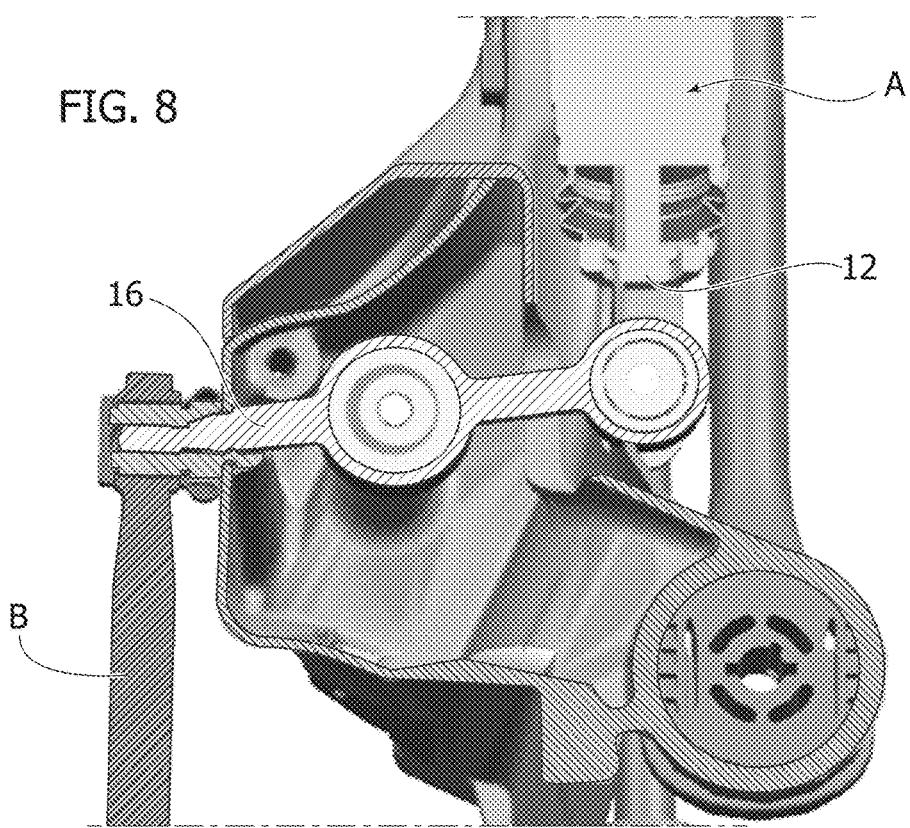
FIG. 8 is a cross-sectional plan view of the detail of FIG. 7

As visible in FIGS. 7, 8, the intermediate portion 16A of the rocker arm 16 is rotatably mounted on a vertical shaft 20 attached to the respective longitudinal beam 3, between the upper wall and the lower wall. Each rocker arm 16 is, therefore, contained within the cavity of the respective longitudinal beam 3, and has its ends protruding outside the beam 3, through openings provided in the beam.

When the actuator A is activated, the rods 12 control the steering rotation of the wheel supports K around the virtual steering axes S, by means of the rocker arms 16 and the control arms B. Thanks to the arrangement of the rocker arms 16, in each operating condition of the suspension, the control arms B remain oriented in a direction that is slightly inclined with respect to a transverse direction, perpendicular to the longitudinal direction of the motor-vehicle, which ensures that the handling performance of the suspension is not compromised.

Figure 11:
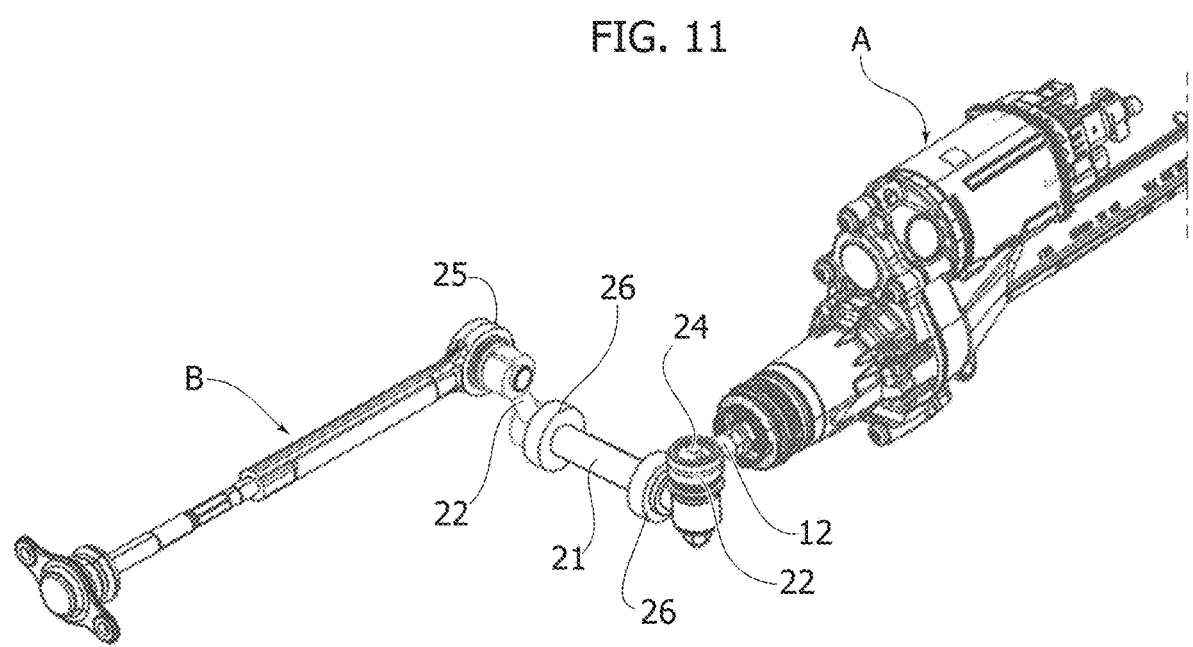
FIG. 11 is a perspective view of the actuation system controlling steering of the rear wheel supports, in the case of a second embodiment.
Figure 12:
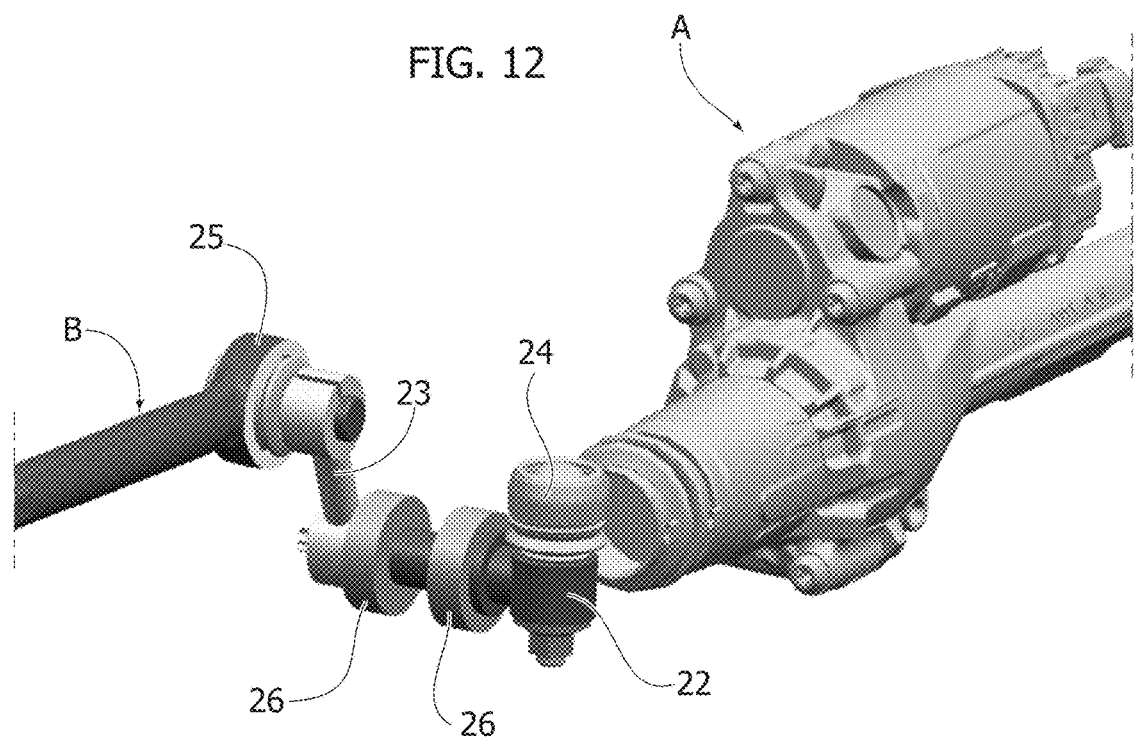
FIG. 12 is another perspective view of the system of FIG. 11.

FIGS. 11, 12 show a second embodiment of the invention, wherein the transmission interposed between each rod 12 of the actuator device A and the respective control arm B of the wheel support comprises a shaft 21 rotatably mounted on the support frame 2 around an axis substantially parallel to the longitudinal direction of the motor-vehicle, and having a first crank 22 and a second crank 23 connected by joints 24, 25, to the rod 12 of the actuator, and to the control arm B of the wheel-support, respectively. A movement of the actuating rod 12 causes a rotation of the rotating shaft 21 by means of the first crank 22. Rotation of the rotating shaft 21 controls a corresponding movement of the control arm B by means of the second crank 23.

In this second embodiment as well, the shaft 21 can be rotatably mounted by means of supports 26 inside the cavity of a respective longitudinal beam 3 of the support frame 2. The cranks 22, 23 protrude outside the beam 3 through openings in the beam (not visible in the drawings).

Figure 13:
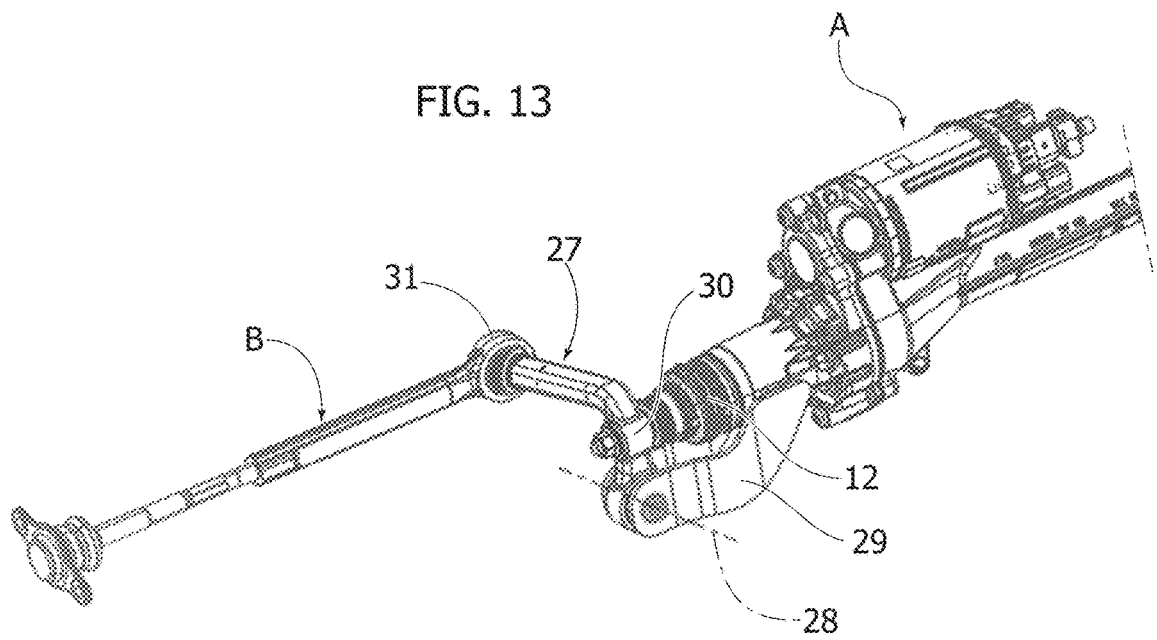
FIG. 13 is a perspective view of the actuation system controlling steering of the rear wheel supports according to a third embodiment.
Figure 14:
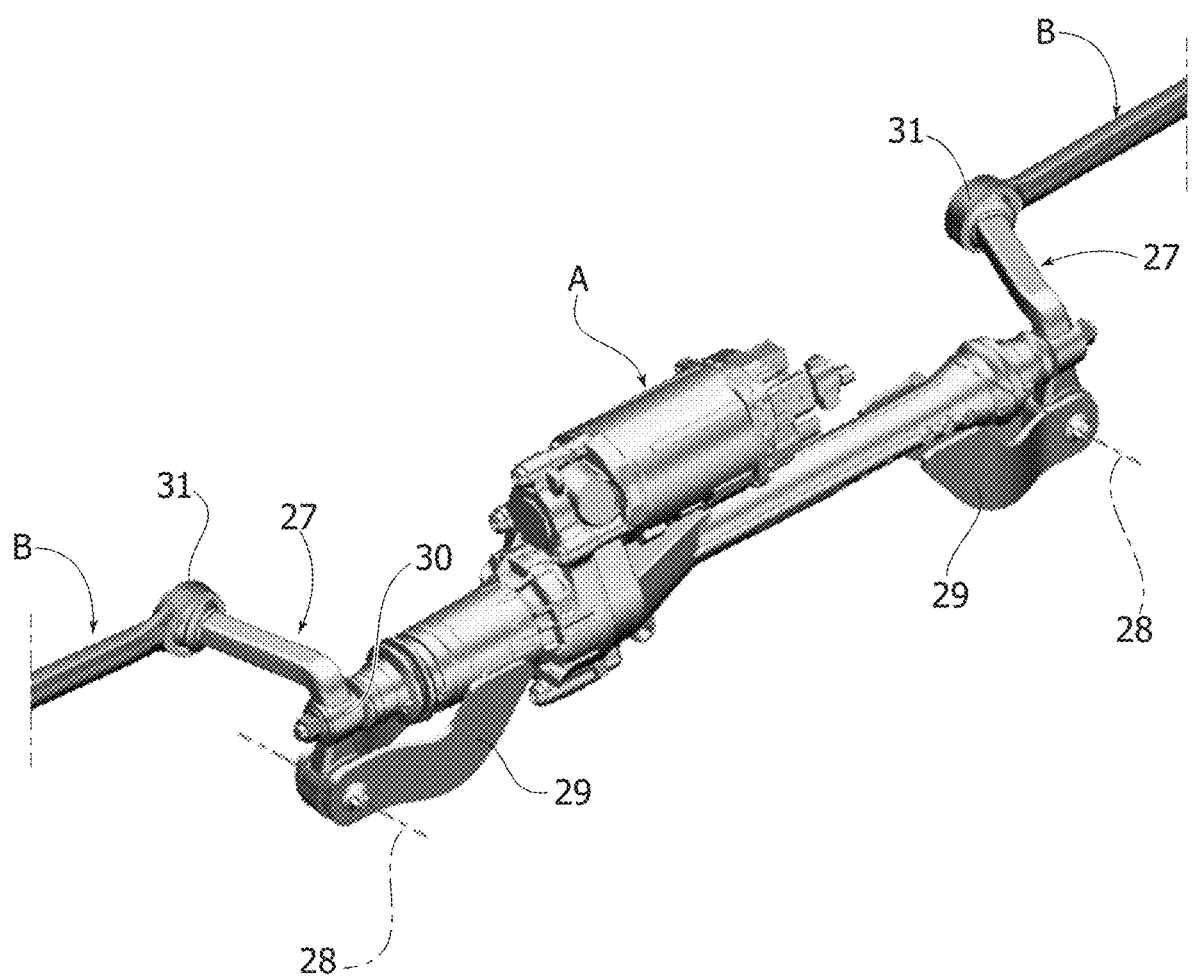
FIG. 14 is another perspective view of the system of FIG. 13.

FIGS. 13, 14 show a third embodiment of the invention wherein the transmission, interposed between each rod 12 of the actuator A and the respective control arm B of the wheel support, comprises a lever 27 supported by the support frame 2 in a rotatable manner about an axis 28 parallel to the longitudinal direction of the motor-vehicle. In the case of the illustrated example, the lever 27 is rotatably mounted around the axis 28 on a bracket 29 fixed to the frame 2. The lever 27 has an intermediate portion thereof connected by means of a joint 30 to the respective rod 12 of the actuator A. The end of the lever 27 opposite to that articulated on the axis 28 is connected by means of a joint 31 to the respective control arm B.

As can be seen in FIGS. 13, 14, in the case of this example, the lever 27 has an L-shaped configuration, with a substantially vertical branch ending with the end that is rotatably mounted around the axis 28 on the support frame 2, and that is connected by means of the joint 30 to the rod 12 of the actuator A. The other branch of the L-shaped body of the lever 27 is directed in a direction parallel to the longitudinal direction of the motor-vehicle, and ends with the end connected by the joint 31 to the control arm B. A movement of the rod 12 causes a rotation of the entire lever 27 around the longitudinal axis 28, and a consequent movement of the control arm B in a substantially transverse direction with respect to the longitudinal direction of the motor-vehicle.

As is evident from the above description, all the embodiments of the invention provide a transmission between each of the actuator rods and the control arm B of the respective wheel support, configured in such a way as to allow, on the one hand, positioning of the actuator device A at a distance from the wheel axis that is sufficient to avoid interference with the motor or differential gear assembly occupying the space between the rear wheels and, on the other hand, arranging the control arms of the wheel supports in directions substantially parallel to a transverse direction, perpendicular to the longitudinal direction of the motor-vehicle or—in any case—forming an angle not exceeding 15 degrees with respect to this direction.

In this way, the required control characteristics of the steering of the rear wheels are maintained without affecting the handling performance of the suspension.

Naturally, without prejudice to the principle of the invention, the details of construction and the embodiments may vary widely with respect to those described and illustrated purely by way of example, without departing from the scope of the present invention, as defined by the attached claims.

What is claimed is:

1. A motor-vehicle with driving and steering rear wheels, comprising:
    a rear suspension system including:
        a rear suspension support frame mounted on a motor-vehicle body, and
        for each motor-vehicle rear wheel, a wheel support which is connected to the support frame by means of a plurality of oscillating arms which are articulated to the wheel support through joints that define a steering axis of the rear wheel, and
    an actuator for controlling steering of the rear wheels, comprising:
        an elongated body mounted on the support frame along a direction transverse to a longitudinal direction of the motor-vehicle, and
        two control rods, protruding from opposite ends of the body of the actuator, and connected to the wheel supports by means of two articulated control arms for controlling the wheel supports,
    wherein:
    within a space between the rear wheels, there is a rear motor of the motor-vehicle or a rear differential unit of the motor-vehicle,
    the body of said actuator is mounted on the support frame along the transverse direction spaced apart from an axis of the rear wheels to an extent sufficient to avoid interference between said actuator and the motor or the differential unit that occupies the space between the rear wheels of the motor-vehicle, and
    the two control arms controlling the wheel supports are substantially parallel to said transverse direction perpendicular to the longitudinal direction of the motor-vehicle, or form an angle therewith which does not exceed 15 degrees, and
    the two control rods protruding from the body of the actuator are each connected to the control arm of the respective wheel support with interposition of a transmission,
    each of the transmissions that connect the two control rods of the actuator to the two control arms of the wheel supports includes a rocker arm, pivotably mounted on the support frame around a substantially vertical axis, and having opposite ends respectively articulated to the respective control rod of the actuator and to the respective control arm controlling the wheel support,
    the support frame comprises two side longitudinal beams connected to each other by a front cross-member and a rear cross-member,
    each of the longitudinal beams of the support frame has a hollow structure, with an upper wall and a lower wall,
    each of said rocker arms has a central portion arranged inside a cavity of the respective longitudinal beam, and is rotatably mounted on a vertical shaft fixed to the support frame and extending inside said cavity, between the upper and lower walls of the respective longitudinal beam, and
    ends of each rocker arm protrude outside the respective longitudinal beam through openings in the beam and are pivotally connected to the respective control rod of the actuator and to the control arm of the respective wheel support.

2. A motor-vehicle with driving and steering rear wheels, comprising:
    a rear suspension system including:
        a rear suspension support frame mounted on a motor-vehicle body, and
        for each motor-vehicle rear wheel, a wheel support which is connected to the support frame by means of a plurality of oscillating arms which are articulated to the wheel support through joints that define a steering axis of the rear wheel, and
    an actuator for controlling steering of the rear wheels, comprising:
        an elongated body mounted on the support frame along a direction transverse to a longitudinal direction of the motor-vehicle, and
        two control rods, protruding from opposite ends of the body of the actuator, and connected to the wheel supports by means of two articulated control arms for controlling the wheel supports,
    wherein:
    within a space between the rear wheels, there is a rear motor of the motor-vehicle or a rear differential unit of the motor-vehicle,
    the body of said actuator is mounted on the support frame along the transverse direction spaced apart from an axis of the rear wheels to an extent sufficient to avoid interference between said actuator and the motor or the differential unit that occupies the space between the rear wheels of the motor-vehicle,
    the two control arms controlling the wheel supports are substantially parallel to said transverse direction perpendicular to the longitudinal direction of the motor-vehicle, or form an angle therewith which does not exceed 15 degrees,
    the two control rods protruding from the body of the actuator are each connected to the control arm of the respective wheel support with interposition of a transmission,
    each of the transmissions that connect the two control rods of the actuator to the two control arms controlling the wheel supports includes a shaft rotatably mounted on the support frame about an axis substantially parallel to the longitudinal direction of the motor-vehicle, and carrying a first crank connected to the respective control rod and a second crank connected to the control arm of the respective wheel support,
    the support frame comprises two side longitudinal beams connected to each other by a front cross-member and a rear cross-member,
    the longitudinal beams of the frame each have a hollow structure, and
    said shaft rotatably mounted on the support frame is arranged inside a cavity of the respective longitudinal beam, and has said first crank and said second crank that protrude outwards of the respective longitudinal beam through openings of the beam, and are articulately connected to the respective control rod of the actuator and to the respective control arm of the wheel support.

3. A motor-vehicle with driving and steering rear wheels, comprising:
a rear suspension system including:
a rear suspension support frame mounted on a motor-vehicle body, and
for each motor-vehicle rear wheel, a wheel support which is connected to the support frame by means of a plurality of oscillating arms which are articulated to the wheel support through joints that define a steering axis of the rear wheel, and
an actuator for controlling steering of the rear wheels, comprising:
an elongated body mounted on the support frame along a direction transverse to a longitudinal direction of the motor-vehicle, and
two control rods, protruding from opposite ends of the body of the actuator, and connected to the wheel supports by means of two articulated control arms for controlling the wheel supports,
wherein:
within a space between the rear wheels, there is a rear motor of the motor-vehicle or a rear differential unit of the motor-vehicle,
the body of said actuator is mounted on the support frame along the transverse direction spaced apart from an axis of the rear wheels to an extent sufficient to avoid interference between said actuator and the motor or the differential unit that occupies the space between the rear wheels of the motor-vehicle,
the two control arms controlling the wheel supports are substantially parallel to said transverse direction perpendicular to the longitudinal direction of the motor-vehicle, or form an angle therewith which does not exceed 15 degrees,
the two control rods protruding from the body of the actuator are each connected to the control arm of the respective wheel support with interposition of a transmission, and
each of the transmissions that connect the two control rods of the actuator to the two control arms of the wheel supports includes:
a lever having one end rotatably mounted on the support frame around an axis parallel to the longitudinal direction of the motor-vehicle,
one end portion swivelly connected to the respective control arm of the wheel support, and
an intermediate portion swivelly connected to the respective control rod of the actuator.

4. The motor-vehicle according to claim 3, wherein each lever has an L-shaped conformation, with a first substantially vertical branch, connected to the respective control rod of the actuator and having a lower end that is pivotally mounted on the support frame, and a second branch substantially parallel to the longitudinal direction of the motor-vehicle terminating with an end connected to the respective control arm of the wheel support.

* * * * *